United States Patent
Kimura et al.

[11] Patent Number: 5,820,962
[45] Date of Patent: Oct. 13, 1998

[54] OPTICAL RECORDING MATERIAL AND OPTICAL RECORDING MEDIUM

[75] Inventors: Shuichi Kimura; Tadashi Ogawa; Makoto Sakamoto, all of Tokyo, Japan

[73] Assignee: Toyo Ink Manufacturing Co., Ltd., Tokyo, Japan

[21] Appl. No.: 860,593

[22] PCT Filed: Dec. 24, 1996

[86] PCT No.: PCT/JP96/03753

§ 371 Date: Oct. 27, 1997

§ 102(e) Date: Oct. 27, 1997

[87] PCT Pub. No.: WO97/23354

PCT Pub. Date: Jul. 3, 1997

[30] Foreign Application Priority Data

Dec. 25, 1995 [JP] Japan .................... 7-336241
Jan. 16, 1996 [JP] Japan .................... 8-004451

[51] Int. Cl.[6] .................................................. B32B 3/00
[52] U.S. Cl. ................ 428/64.1; 428/64.2; 428/64.4; 428/64.8; 428/913; 430/270.17; 430/270.19; 430/270.21; 430/495.1; 430/945; 369/288
[58] Field of Search ................ 428/64.1, 64.2, 428/64.4, 64.8, 913; 430/270.16, 270.17, 270.19, 270.21, 495.1, 945; 369/283, 288

[56] References Cited

FOREIGN PATENT DOCUMENTS

| | | |
|---|---|---|
| 0 376 745 | 7/1990 | European Pat. Off. . |
| 0 381 210 | 8/1990 | European Pat. Off. . |
| 56-11959 | 2/1981 | Japan . |
| 61-74891 | 4/1986 | Japan . |
| 02 108 589 | 4/1990 | Japan . |
| 3-281386 | 12/1991 | Japan . |
| 4-214388 | 8/1992 | Japan . |
| 5-279580 | 10/1993 | Japan . |
| 09164767 | 6/1997 | Japan . |

*Primary Examiner*—Elizabeth Evans
*Attorney, Agent, or Firm*—Wenderoth, Lind & Ponack, L.L.P.

[57] ABSTRACT

An optical recording material of the following formula (1) and an optical recording medium excellent in recording sensitivity, light resistance and durability, having a recording layer containing the material, the formula (1),

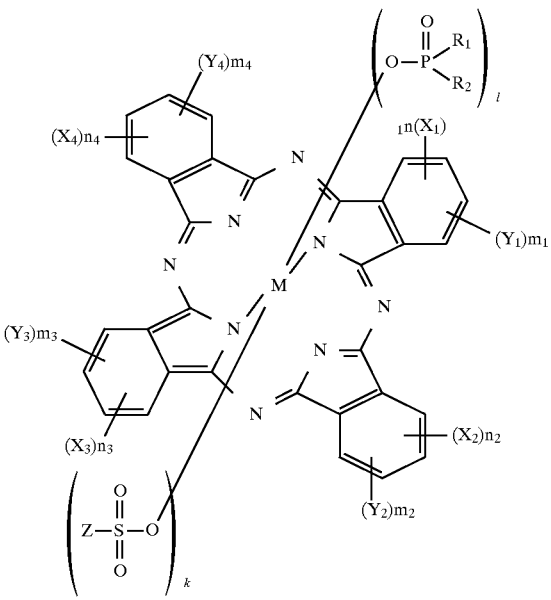

wherein each of $X_1$ to $X_4$ is a hydrogen atom, an alkyl group, an aryl group, an alicyclic residue, an aralkyl group, a heterocyclic ring, an alkoxy group, an aryloxy group or an alkylthio group, each of $Y_1$ to $Y_4$ is a hydrogen atom, a halogen atom, a nitro group, a phthalimidemethyl group or a sulfoneamide group, each of $R_1$ and $R_2$ is a hydrogen atom, a halogen atom, a hydroxyl group, an alkyl group, an aryl group, an aralkyl group, an alkoxy group, an aryloxy group, an alkylthio group, an arylthio group, an alkylamino group, a dialkylamino group, an arylamino group or a diarylamio group, M is Al, Ga, In, Si, Ge or Sn, Z is an azo compound, an anthraquinone compound or a metal complex compound, $n_1$ to $n_4$ are 1 to 4, $m_1$ to $m_4$ are 0 to 4, $k$ is 1 or 2, and $l$ is 0 or 1, provided that $k+l$ is 1 or 2.

4 Claims, No Drawings

OPTICAL RECORDING MATERIAL AND OPTICAL RECORDING MEDIUM

TECHNICAL FIELD

The present invention relates to an optical recording medium which permits the writing and reading of data with laser light. More specifically, it relates to an optical recording film material, a recording film composition and a medium constitution for a write-once compact disk (CD-R).

TECHNICAL BACKGROUND

As a write-once optical disk having an edit function, at present, there is practically used a CD-R having a reflection film of gold formed on a recording film formed of an organic dyestuff such as cyanine, in which CD format or CD-ROM format signal is recorded at a wavelength of 780 nm and data is read out with a CD or CD-ROM reproducer. Since, however, the cyanine dystuff is generally poor in light stability, a CD or CD-ROM having a single surface structure has a risk of its data reliability being questioned under a use condition where it is directly exposed to sunlight.

Attempts have been therefore made to use a physico-chemically stable phthalocyanine dyestuff as a recording film material in place of the cyanine dyestuff. JP-B-4-53713, JP-A-4-214388 and JP-A-5-1272 propose the use of phthalocyanine compounds, and some of them are practically used. CR-Rs using the above phthalocyanine materials have characteristics equivalent to those of CD-R using the cyanine dyestuff and work as media based upon "Orange Book", and some of them are excellent over medium using the cyanine dye in light resistance.

As CD-ROMS have been widely increasingly used in recent years, CD-R media are required to satisfy fast-access storage and fast-access reading, and one medium is required to comply with not only random-access storage but also double-speed and quad-speed storage. Since the phthalocyanine dyestuff is generally poor in recording sensitivity as compared with the cyanine dyestuff as described above, the phthalocyanine dyestuff does not satisfy all of these requirements. For improving recording sensitivity, therefore, it is necessary to modify the dyestuff structure by introducing a highly pyrolyzable substituent as is disclosed in JP-A-7-20550, or it is necessary to use a pyrolysis-promoting additive in combination as is disclosed in JP-A-59-92448. The above techniques succeed in attaining recording sensitivity which can satisfy fast-access storage, while it is generally attained at the sacrifice of durability and light resistance. Further, as a result of an improvement in recording sensitivity, the stability of storage characteristics becomes insufficient due to unstable forms of recording pits, and it is consequently further difficult to provide CD-R with good compatibility with all of commercially available CD players. As shown in JP-B-5-58915 and JP-A-7-98887, therefore, attempts are made to stabilize characteristics of stored signals by incorporating an agent which improves the properties of a surface layer of a recording film or an agent which controls the form of recording pits. However, the recording layer has a complicated constitution, and the productivity is inferior as compared with a case using a dyestuff alone. Otherwise, there is another problem that the reliability is poor since these agents themselves are poor in light resistance.

The present inventors have made diligent studies to overcome the above problems, and as a result, have found that an optical recording medium having recording sensitivity adequate for fast-access storage, having improved reliability with regard to light resistance and durability and having stabilized recording characteristics can be obtained by incorporating a phthalocyanine compound having a specific structure as an organic dyestuff to be incorporated into a recording layer, and the present invention has been accordingly arrived at.

DISCLOSURE OF THE INVENTION

The present invention 1 is an optical recording material which is a phthalocyanine compound having a specific structure of the formula (1) and is used as an organic dyestuff used for a recording layer in an optical recording medium formed of four layers comprising a transparent substrate, the recording layer formed of the organic dyestuff, a reflection layer and a protective layer,

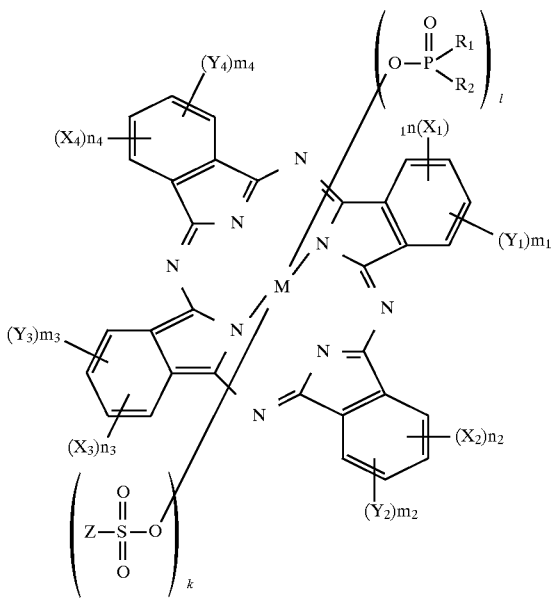

wherein each of $X_1$ to $X_4$ is independently a hydrogen atom, an alkyl group, a substituted alkyl group, an aryl group, a substituted aryl group, an alicyclic residue, a substituted alicyclic residue, an aralkyl group, a substituted aralkyl group, a heterocyclic ring, a substituted heterocyclic ring, an alkoxy group, a substituted alkoxy group, an aryloxy group, a substituted aryloxy group, an alkylthio group or a substituted arylthio group, each of $Y_1$ to $Y_4$ is independently a hydrogen atom, a halogen atom, a nitro group, a phthalimidemethyl group, a substituted phthalimidemethyl group, a sulfoneamide group or a substituted sulfoneamide group, each of $R_1$ and $R_2$ is independently a hydrogen atom, a halogen atom, a hydroxyl group, an alkyl group, a substituted alkyl group, an aryl group, a substituted aryl group, an aralkyl group, a substituted aralkyl group, an alkoxy group, a substituted alkoxy group, an aryloxy group, a substituted aryloxy group, an alkylthio group, a substituted alkylthio group, an arylthio group, a substituted arylthio group, an alkylamino group, a substituted alkylamino group, a dialkylamino group, a substituted dialkylamino group, an arylamino group, a substituted arylamino group, a diarylamino group or a substituted diarylamino group, M is Al, Ga, In, Si, Ge or Sn, Z is an azo compound, an anthraquinone compound or a metal complex compound of one of the following formulae (2) to (6), $n_1$ to $n_4$ are the numbers of substituents $X_1$ to $X_4$, each of them being independently an integer of 1 to 4, $m_1$ to $m_4$ are the numbers of substituents $Y_1$ to $Y_4$, each of them being independently an integer of 0 to 4, k is the number of an axial substituent, $-OSO_2-Z$, and is 1 or 2, and l is the number of an axial substituent, $-OP(=O)R_1R_2$, and is 0 or 1, provided that k+l is 1 or 2.

The formula (2),

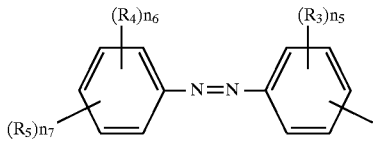

wherein each of $R_3$, $R_4$ and $R_5$ is independently a hydrogen atom, a halogen atom, a hydroxyl group, a nitro group, a cyano group, a carboxylic acid group, a carboxylic acid ester group, a sulfonic acid group, a sulfonic acid ester group, an alkyl group, a substituted alkyl group, an aryl group, a substituted aryl group, a cycloalkyl group, a substituted cycloalkyl group, an aralkyl group, a substituted aralkyl group, a heterocyclic ring, a substituted heterocyclic ring, an alkoxy group, a substituted alkoxy group, an aryloxy group, a substituted aryloxy group, an alkylthio group, a substituted alkylthio group, an arylthio group, a substituted arylthio group, an amino group, an alkylamino group, a substituted alkyl amino group, a dialkylamino group, a substituted dialkylamino group, an arylamino group or a substituted arylamino group, $n_5$ is the number of the substituent $R_3$ and is an integer of 0 to 4, and $n_6$ and $n_7$ are the numbers of the substituents $R_4$ and $R_5$, each of them being an integer of 0 to 5.

The formula (3),

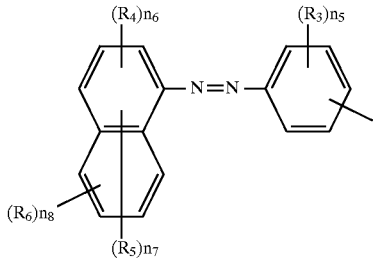

wherein $R_3$ to $R_6$ have the same meanings as those of $R_3$ to $R_5$ in the formula (2), $n_5$ is the number of the substituent $R_3$ and is an integer of 0 to 4, and $n_6$ to $n_8$ are the numbers of the substituents $R_4$ to $R_6$, each of them being an integer of 0 to 3.

The formula (4),

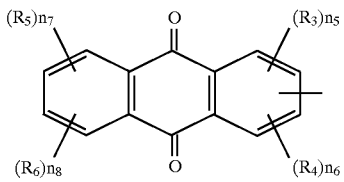

wherein $R_3$ to $R_6$ have the same meanings as those of $R_3$ to $R_5$ in the formula (2), and $n_5$ to $n_8$ are the numbers of the substituents $R_3$ to $R_6$, each of them being an integer of 0 to 3.

The formula (5)

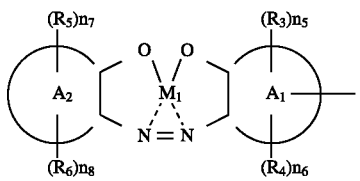

wherein $A_1$ and $A_2$ are benzene rings or naphthalene rings, $R_3$ to $R_6$ have the same meanings as those of $R_3$ to $R_5$ in the formula (2), $n_5$ to $n_8$ are the numbers of the substituents $R_3$ to $R_6$, each of them being an integer of 0 to 3, and $M_1$ is a transition metal atom.

The formula (6)

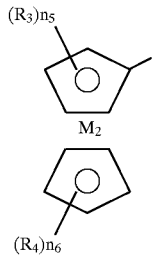

wherein $R_3$ and $R_4$ have the same meanings as those of $R_3$ to $R_5$ in the formula (2), $n_5$ is the number of the substituent $R_3$ and is an integer of 0 to 4, $n_6$ is the number of the substituent $R_4$ and is an integer of 0 to 5, and $M_2$ is a transition metal.

When a phthalocyanine compound has, as an axial substituent, a compound having a sulfonic acid group, the sulfonic acid and a central metal ionically may bond to each other, and characteristically, the axial substituent improves the reliability with regard to light resistance and durability and provides stable recording characteristics. Preferably, the phthalocyanine compound has an asymmetric structure in which both a substituent formed of a compound having phosphor and a substituent formed of a compound having a sulfonic acid group are introduced as axial substituents relative to the central metal, or these axial sbustituents are formed only of substituents formed of compounds having sulfonic acid groups.

The present invention 2 is an optical recording medium having a recording layer containing at least one of phthalocyanine compounds having the above-specified structure.

The present inventors previously found that a phthalocyanine compound having a structure having particular axial substituents such as a phosphoric acid ester group and a phosphine acid ester group relative to a central metal has remarkably superior light resistance (JP-A-4-214388, Preprint of Announcements of Coloring Material Researches, 1994, 11B-12) and succeeded in providing an optical recording medium excellent in light resistance. However, the above phthalocyanine compound is not satisfactory in recording sensitivity for complying with fast-access storage in recent years.

For improving recording sensitivity, it is necessary to modify a dyestuff structure by introducing a highly pyrolyzable bulky substituent disclosed in JP-A-7-20550 for inhibiting the associativeness of phthalocyanine molecules and increasing pyrolyzability, or it is necessary to use an additive which promotes pyrolysis in combination as is disclosed in JP-A-59-24228. These techniques can attain the recording sensitivity which can comply with fast-access storage, while durability and light resistance are sacrificed in usual cases. Further, as a result of an improvement in recording sensitivity, the stability of storage characteristics becomes insufficient due to unstable forms of data storage pits, and it is consequently further difficult to provide CD-R with good compatibility with all of commercially available CD players. As shown in JP-B-5-58915 and JP-A-7-98887, therefore, attempts are made to stabilize characteristics of stored signals by incorporating an agent which improves the properties of a surface layer of a recording film or an agent which controls the form of data storage pits. However, the recording layer consequently has a complicated constitution, and there is a problem that the productivity is inferior as compared with a case using a dyestuff alone.

Sato et al propose an optical recording medium using a phthalocyanine compound having a particular structure in axial substituent (JP-A-3-281386). However, not only the above proposed compound fails to attain recording sensitivity which can sufficiently comply with fast-access storage, but also there is a problem in the stability of recording characteristics since some embodiments of the compound is poor in light resistance or since some embodiments have an adverse effect on recording characteristics.

JP-A-5-279580 and JP-A-6-65514 disclose embodiments using an azo compound or its metal complex as an optical recording material, and there is another embodiment in which the recording sensitivity is improved by using it in combination with a phthalocyanine compound. However, no embodiment has been found in which an optical recording material is prepared by bonding it to the axial substituent of a phthalocyanine compound like the present invention in order to improve the recording characteristics.

JP-A-7-98887 discloses a variety of metal complexes as an agent which controls the form of data storage pits. However, these are all used as an additive for improving the recording characteristics of optical recording materials such as a phthalocyanine compound, and none of them have a structure in which they are integrated into an organic dyestuff used in a recording layer. Further, it is shown that the above metal complexes effectively work to control the form of data storage pits owing to controlling of the heat generation during a recording time so that recorded signals are improved. However, it is a problem that the above metal complexes themselves are generally poor in light resistance. For example, when they are used in combination with a phthalocyanine compound, in most cases, the light resistance of the phthalocyanine compound itself cannot be retained.

The present inventors have made diligent studies, and have found that a phthalocyanine compound having a particular structure, having an azo compound, an anthraquinone compound or a metal complex compound of any one of the formulae (2) to (6) through a sulfonic acid group, can overcome all of the above three problems, that is, having recording sensitivity which can comply with fast-access storage, being excellent in light resistance and durability, and forming proper data storage pits during a recording time so that recording characteristics are stable. The present inventors have accordingly succeeded in providing an optical recording medium which is inexpensive and has high productivity.

The structures of the compounds of the formulae and the substituents to the compounds in the present invention will be explained in detail hereinafter. In the formulae, the halogen atom includes fluorine, chlorine, bromine and iodine. The alkyl group which may have a substituent includes methyl, ethyl, propyl, isopropyl, butyl, isobutyl, tert-butyl, neopentyl, n-hexyl, n-octyl, stearyl, 2-ethylhexyl, trichloromethyl, trifluoromethyl, 2,2,2-trifluoroethyl, 2,2-dibromoethyl, 2,2,3,3-tetrafluoropropyl, 2-ethoxyethyl, 2-butoxyethyl and 2-nitropropyl. The aryl group which may have a substituent includes phenyl, naphthyl, anthranyl, p-methylphenyl, p-nitrophenyl, p-methoxyphenyl, 2,4-dichlorophenyl, pentafluorophenyl, 2-aminophenyl, 2-methyl-4-chlorophenyl, 4-hydroxy-1-naphthyl, 6-methyl-2-naphthyl, 4,5,8-trichloro-2-naphthyl, anthraquinolyl and 2-aminoanthraquinolyl. The alicyclic residue which may have a substituent includes cyclopentyl, 2,5-dimethylcyclopentyl, cyclohexyl, 4-tert-butylcyclohexyl and adamantyl. The aralkyl group which may have a substituent includes benzyl, 4-methylbenzyl, 4-tert-butylbenzyl, 4-methoxybenzyl, 4-nitrobenzyl and 2,4-dichlorobenzyl. The heterocyclic ring residue which may have a substituent includes pyridinyl, 3-methylpyridinyl, pyrazinyl, pipedinyl, N-methylpipedinyl, pyranyl, morphonyl, N-methylpyrrolinyl and acridinyl. The alkoxy group which may have a substituent includes methoxy, ethoxy, propoxy, isopropoxy, n-butoxy, isobutyloxy, tert-butyloxy, neopentyloxy, n-hexyloxy, n-octyloxy, stearyloxy, 2-ethylhexyloxy, trichloromethoxy, trifluoromethoxy, 2,2,2-trifluoroethoxy, 2,2,3,3-tetrafluoropropyloxy, 2-ethoxyethoxy, 2-butoxyethoxy and 2-nitropropoxy. The aryloxy group which may have a substituent includes phenoxy, naphthoxy, anthranyloxy, p-methylphenoxy, p-nitrophenoxy, p-methoxyphenoxy, 2,4-dichlorophenoxy, pentafluorophenoxy and 2-methyl-4-chlorophenoxy. The alkylamino group which may have a substituent includes methylamino, ethylamino, dimethylamino, diethylamino, diisopropyl and cylcohexylamino. The arylamino group which may have a substituent includes phenylamino, p-nitrophenylamino, 4-methylphenylamino, diphenylamino and di(4-methoxyphenyl)amino. The above compounds are examples, and each group shall not be limited thereto.

Typical examples of the phthalocyanine compound of the present invention which structurally has particular axial substituents, represented by the formula (1), include the following phthalocyanine compounds (a) to (n).

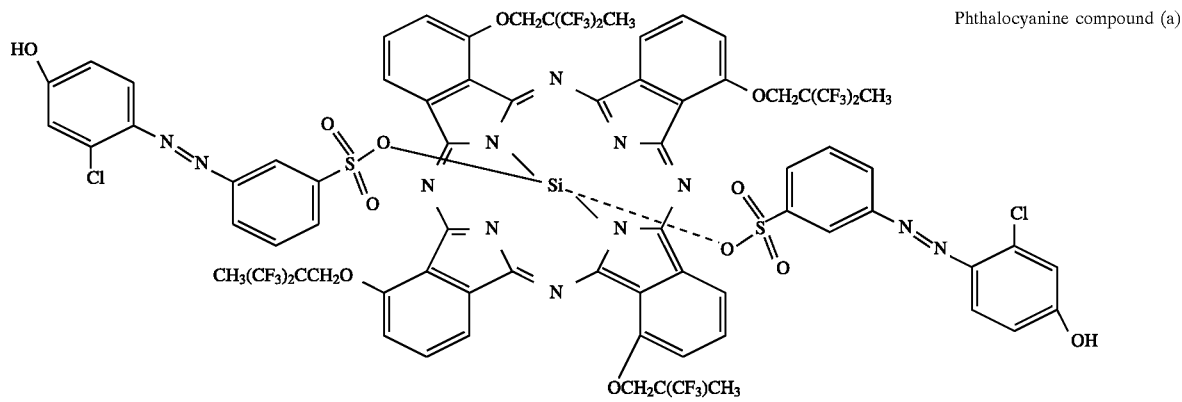
Phthalocyanine compound (a)
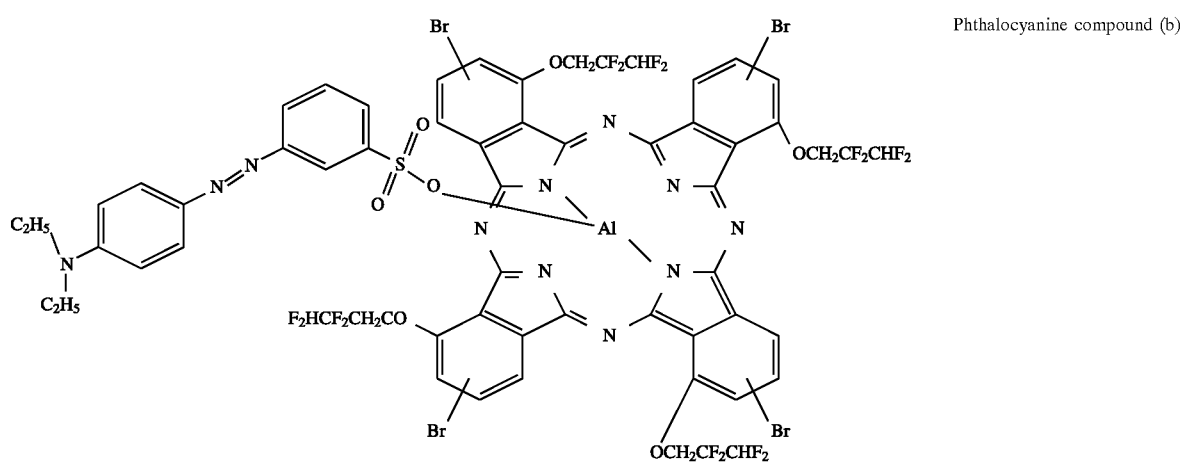
Phthalocyanine compound (b)
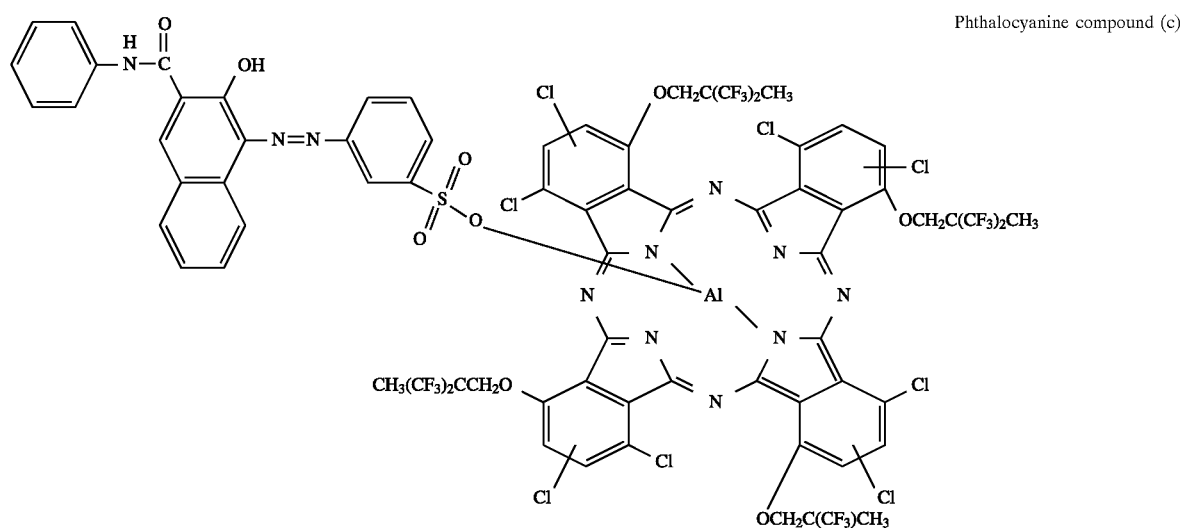
Phthalocyanine compound (c)

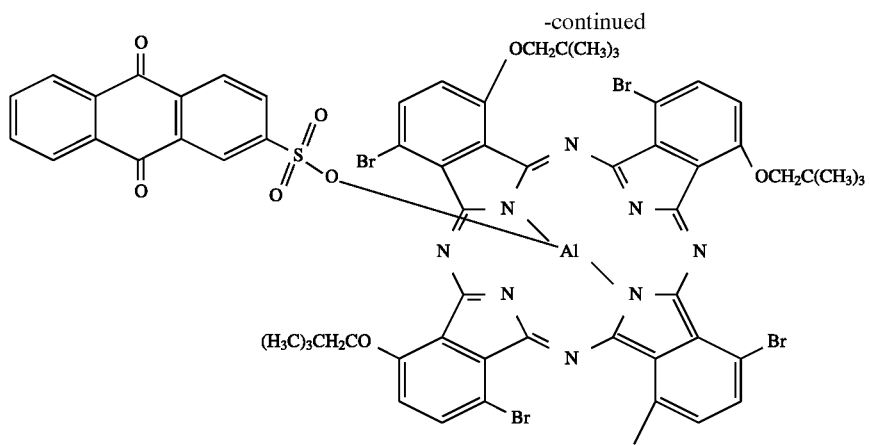
Phthalocyanine compound (d)
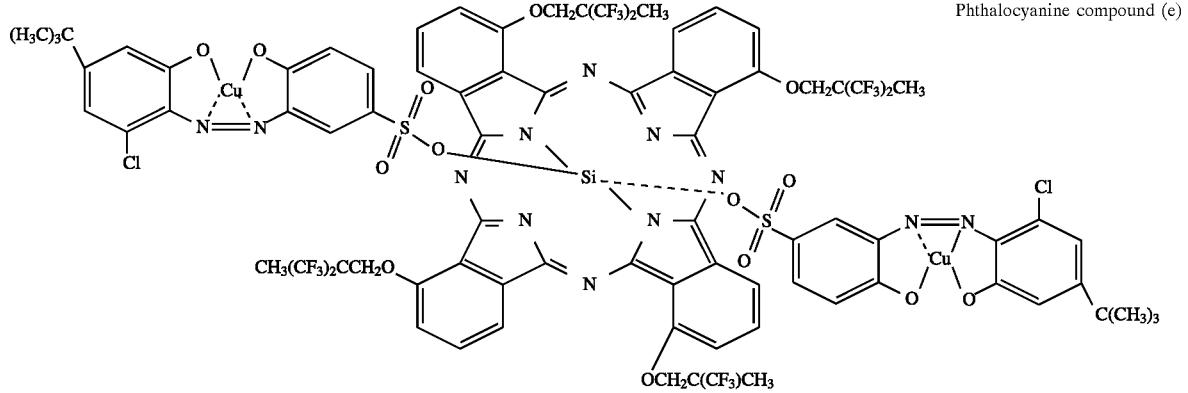
Phthalocyanine compound (e)
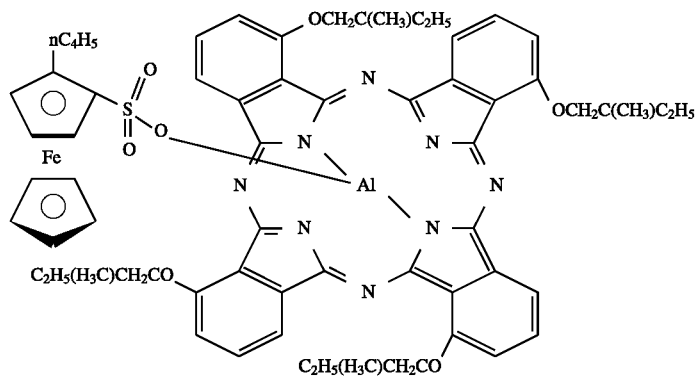
Phthalocyanine compound (f)
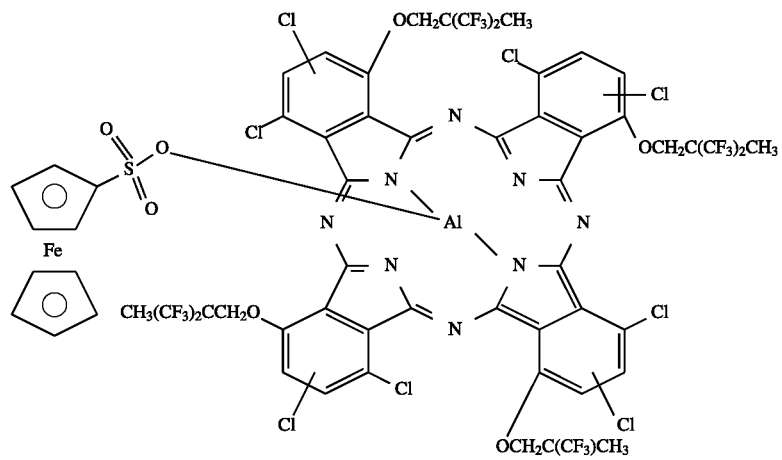
Phthalocyanine compound (g)

-continued
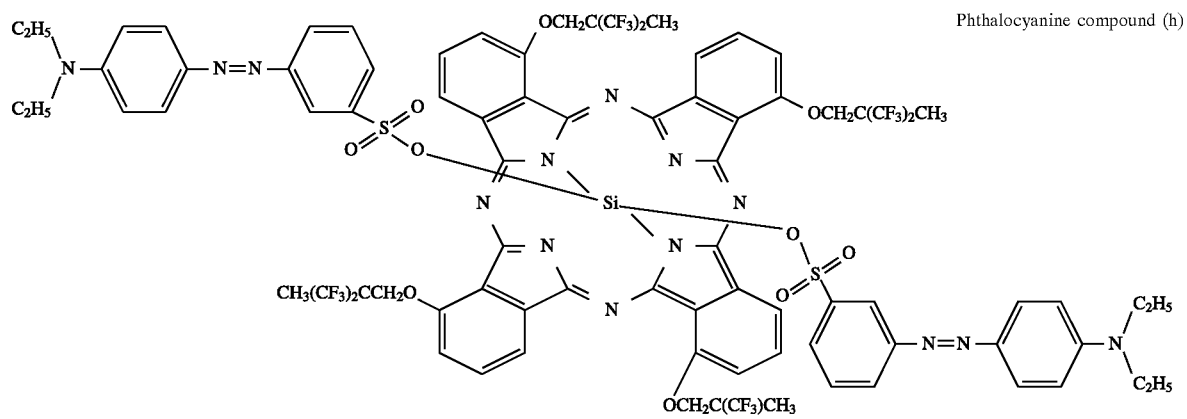
Phthalocyanine compound (h)
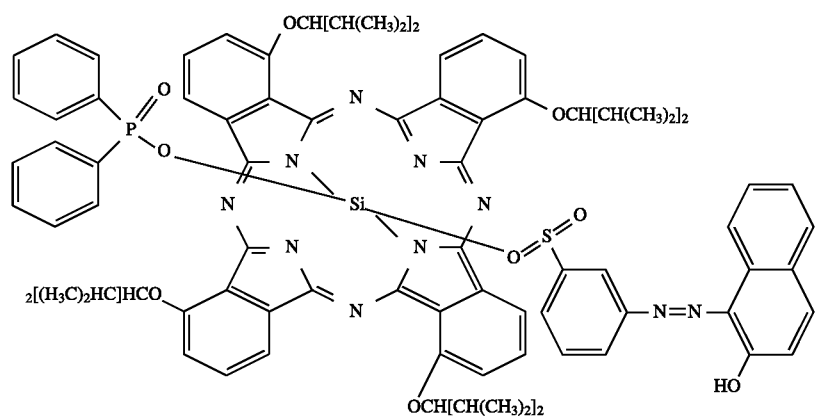
Phthalocyanine compound (i)
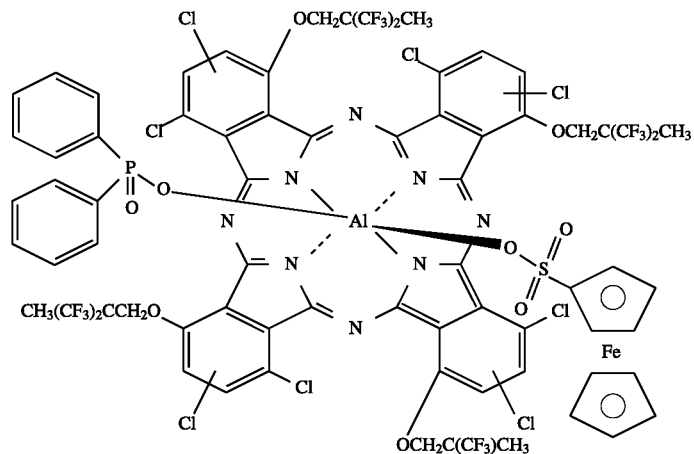
Phthalocyanine compound (j)

-continued
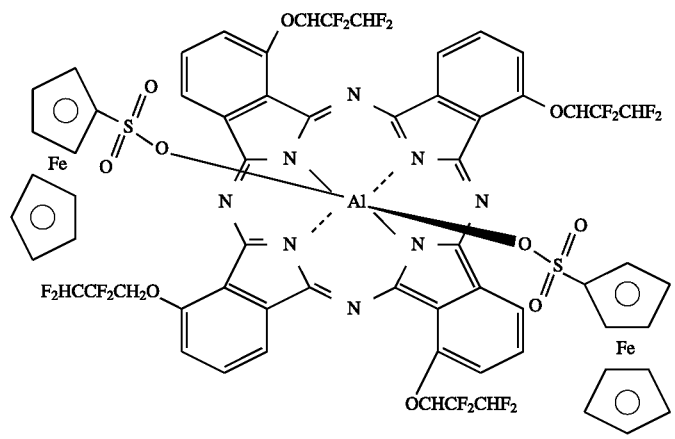
Phthalocyanine compound (k)
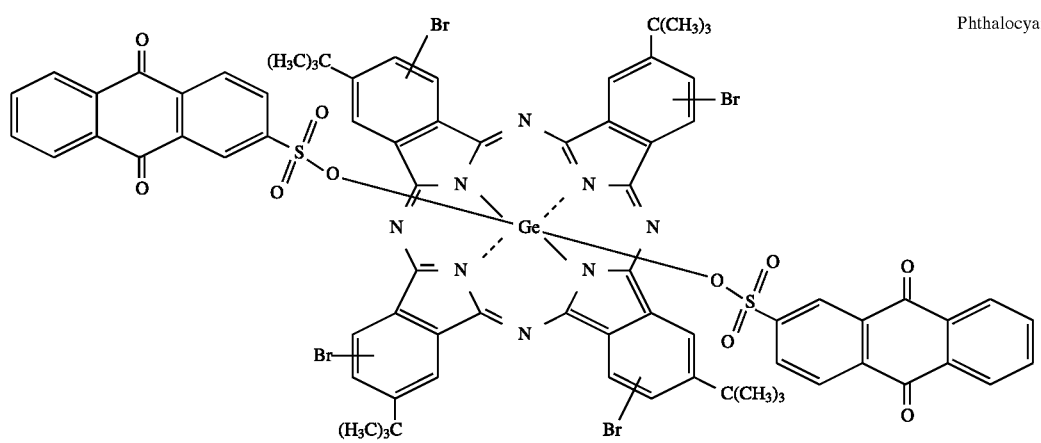
Phthalocyanine compound (l)
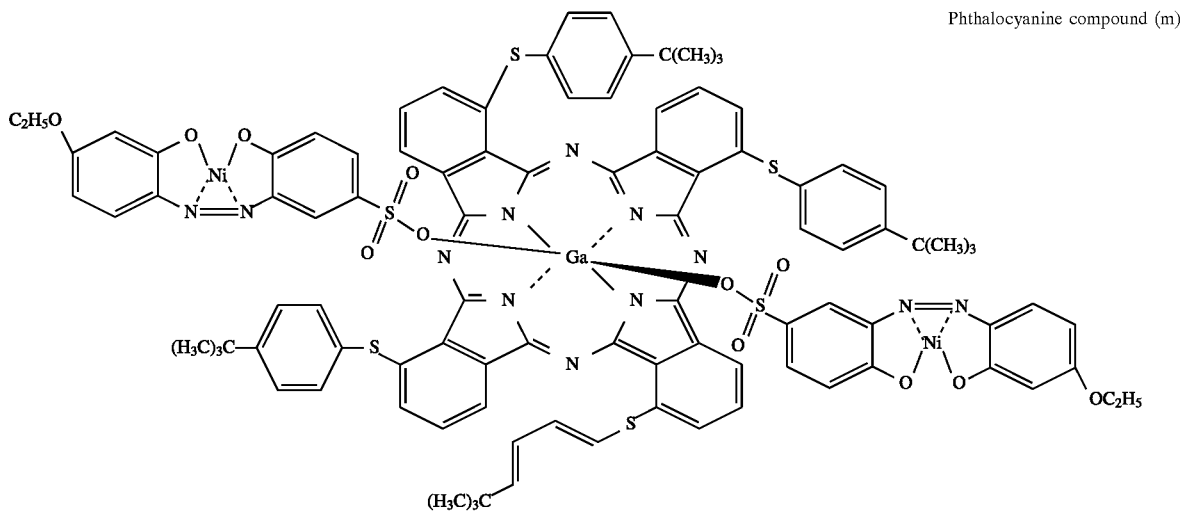
Phthalocyanine compound (m)

-continued

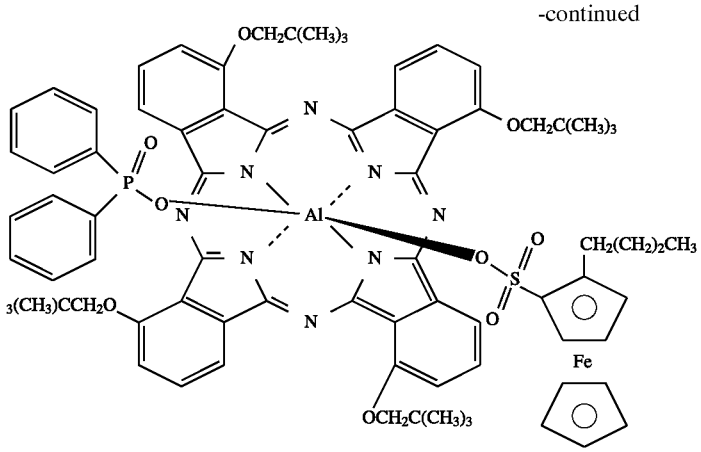

Phthalocyanine compound (n)

The recording layer can be formed by any one of dry process and wet process methods. The dry process includes a vacuum deposition method and a sputtering method. The wet process includes a spin coating method, a dipping method, a spray method, a roll coating method and an LB (Langmuir-Blodgett) method. The recording film material of the present invention shows high solubility in generally used organic solvents such as alcohol-containing, ketone-containing, cellosolve-containing, halogen-containing, hydrocarbon-containing and chlorofluorocarbon-containing solvents, and the recording layer is preferably formed therefrom by a spin coating method in view of productivity and uniformity of the recording film. When the above so-called application method is used, a polymer binder may be added as required.

The polymer binder includes an epoxy resin, an acrylic resin, a polycarbonate resin, a polyester resin, a polyamide resin, a polyvinyl chloride resin, a nitrocellulose resin and a phenolic resin, although the polymer binder shall not be limited to these. The mixing ratio of the polymer binder is not specially limited, while the amount of the polymer binder based on the deystuff is preferably 30% or less. The optimum film thickness of the recording layer in the present invention differs depending upon the kind and combination of recording film materials, and is therefore not specially limited, while it is preferably in the range of from 500 to 3,000 angstroms, more preferably 800 to 1,500 angstroms.

The material for the reflection layer in the present invention includes metals such as gold, silver, copper, platinum, aluminum, cobalt and tin, and alloys, oxides and nitrides containing these as main components, while gold is the most suitable since it shows a high absolute reflectance and is excellent in safety. A high-reflection film of an organic compound may be used in some cases. As a method of forming the reflection film, a dry process such as a vacuum deposition method or a sputtering method is the most preferred, while the method shall not be limited to these. The optimum film thickness of the reflection film is not specially limited, while it is preferably in the range of from 400 to 1,600 angstroms.

Further, a protective layer is formed on the reflection film to protect the disk. As a material for the protective film, an ultraviolet light curable resin is preferred, and the protective film is preferably formed by a method in which the ultraviolet light curable resin is applied by a spin coating method and cured by irradiation with ultraviolet light, while the material and the method shall not be limited to the above. The film thickness of the protective layer is preferably in the range of 2 to 20 μm, since a thinner film shows a decreased effect and since a thicker film causes poor mechanical properties such as distortion of a disk due to shrinkage which occurs when the resin is cured.

The disk substrate used in the present invention preferably has a light transmissivity of at least 85% and less optical anisotropy, for writing and reading signals. Examples of the disk substrate include substrates formed of glass, thermoplastic resins such as an acrylic resin, a polycarbonate resin, a polyester resin, a polyamide resin, a polystyrene resin and a polyolefin resin, and thermosetting resins such as an epoxy resin and an acrylic resin. Of these, a substrate formed of a thermoplastic resin is preferred owing to easiness in molding and easiness in providing wobble signals for ATIP and a guide groove. A substrate formed of an acrylic resin or a polycarbonate resin is particularly preferred in view of optical characteristics, mechanical properties and a cost.

The form of the guide groove in the substrate is not specially limited, and the form may be trapezoid, U letter shaped or V letter shaped. The optimum values of dimensions of the guide groove differ depending upon the kind and combination of recording film materials. Generally, the average groove width (width in the position having a height of ½ of a groove depth) is preferably in the range of from 0.4 to 0.6 μm, and the groove depth is preferably in the range of from 1,000 to 2,000 angstroms. The disk in the present invention is required to function as CD or CD-ROM after a recording is effected, and it is therefore preferably based on the CD-ROM standard (Red Book) and the CD-R standard (Orange Book).

Phthalocyanine compounds of the formula (1) in the present invention may be used alone or in combination. For balancing recording characteristics, other phthalocyanine compound may be added and used in combination, while the "other phthalocyanine compound" is required to be excellent in light resistance and durability. Preferred is a phthalocyanine compound having excellent light resistance as disclosed in JP-A-4-214388, which has particular axial substituents in structure in which a phosphoric acid ester and a phosphine acid ester group bond to a central metal.

The phthalocyanine compound of the formula (1) can be obtained by reacting a phthalocyanine compound having a central metal having a hydroxyl group with a sulfonic acid of an azo compound, an anthraquinone compound or a metal complex compound which is to be introduced as an axial substituent or a halide of the sulfonic acid, as a reaction reagent, in a proper solvent. Further, when a phthalocyanine compound has a central metal which is a trivalent metal such as Al or Ga, the phthalocyanine compound can form a salt with the above compound having a sulfonic acid group, even if the phthalocyanine compound has a structure having a particular axial substituent such as a phosphoric acid ester group or a phosphine acid ester group. In this case, the central metal and the sulfonic acid group ionically bond to each other.

The present invention will be specially explained with reference to Examples hereinafter.

SYNTHESIS EXAMPLE 1

Synthesis of phthalocyanine compound (a)

3.0 Grams of dihydroxysilicon tetra[2,2'-bis (trifluoromethyl) propoxy ] phthalocyanine was dissolved in 100 ml of N-methylpyrrolidone, 1.0 g of 3-(2-chloro-4-hydroxyphenylazo)benzenesulfonic acid was added, and the mixture was stirred under heat at 80° C. for 2 hours. The reaction mixture was poured into 2.0 l of ice water, and a precipitated crystal was recovered by filtration, washed with water and dried to give a blue powder. The powder was dissolved in 200 ml of chloroform, and insolubles were filtered off. The solvent as the filtrate was distilled off to give 1.6 g of a greenish blue powder. The powder was analyzed by FD-MS to show that it was a phthalocyanine compound (a).

SYNTHESIS EXAMPLE 2

Synthesis of phthalocyanine compound (b)

1.2 Grams of a greenish blue powder was obtained in the same manner as in Synthesis Example 1 except that the dihydroxysilicon tetra[2,2'-bis(trifluoromethyl)-propoxy] phthalocyanine was replaced with hydroxyaluminum tetrabromotetra(2,2,3,3-tetrafluoropropoxy)phthalocyanine and that the 3-(2-chloro-4-hydroxyphenylazo) benzenesulfonic acid was replaced with 3-(4-diethylaminophenylazo)-benzenesulfonic acid. The powder was analyzed by FD-MS to show that it was a phthalocyanine compound (b).

SYNTHESIS EXAMPLE 3

3.2 Grams of hydroxyaluminum octachlorotetra[2,2'-bis (trifluoromethyl)propoxy]-phthalocyanine was dissolved in 80 ml of anhydrous sulforan スルホラン, 1.0 g of sulfonic acid of an azo dyestuff of the formula below was added, and the mixture was stirred under heat at 100° C. for 2 hours. The reaction mixture was poured into 1.0 l of ice water, and the resultant precipitate was recovered by filtration and washed with water to give a bluish green paste. The paste was dissolved in 600 ml of methanol, and insolubles were filtered off. Then, 150 ml of water was dropwise added to the filtrate, and the mixture was stirred for 3 hours. The resultant precipitate was recovered by filtration, washed with metal/water (4/1) mixed liquids and dried to give 0.6 g of bluish green powder. The powder was analyzed by FD-MS to show that it was a phthalocyanine compound (c).

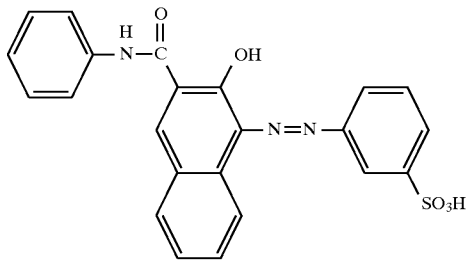

SYNTHESIS EXAMPLE 4

Synthesis of phthalocyanine compound (d)

2.8 Grams of hydroxyaluminum tetrabromo-tetra (neopentyloxy)phthalocyanine and 0.5 g of pyridine were added to 150 ml of dioxane, then, 4.0 g of anthraquinone-2-sulfonic acid chloride was gradually added, and the mixture was refluxed under heat for 2 hours. The reaction mixture was cooled, and then the solvent was distilled off under reduced pressure. The residue was dissolved in 400 ml of ethanol, and insolubles were filtered off. Then, 100 ml of water was dropwise added to the filtrate, and the mixture was stirred for 3 hours. The resultant precipitate was recovered by filtration, washed with methal/water (4/1) mixed liquids and dried to give 1.1 g of a bluish green powder. The powder was analyzed by FD-MS to show that it was a phthalocyanine compound (d).

SYNTHESIS EXAMPLE 5

Synthesis of phthalocyanine compound (e)

3.2 Grams of dihydroxysilicon tetra[2,2'-bis (trifluoromethyl)propoxy]phthalocyanine was dissolved in 10 ml of dimethylaminoacetamide, 1.0 g of sulfonic acid of a copper complex of the formula below was added, and the mixture was stirred under heat at 90° C. for 4 hours. The reaction mixture was poured into 1.0 l of ice water, and the resultant precipitate was recovered by filtration and washed with water to give a green paste. The paste was dissolved in 800 ml of toluene, and insolubles were filtered off. Then, the residue was washed with water and dried with magnesium sulfate, and then the solvent was distilled off to give 1.6 g of a green powder. The powder was analyzed by FD-MS to show that it was a phthalocyanine compound (e).

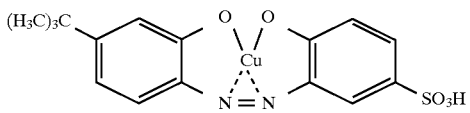

SYNTHESIS EXAMPLE 6

Synthesis of phthalocyanine compound (f)

3.0 Grams of hydroxyaluminum tetra[(2-methyl)butoxy] phthalocyanine and 1.0 g of n butylferrocenesulfonic acid were added to 150 ml of toluene, and the mixture was refluxed under heat for 3 hours. The reaction mixture was filtered, and then the resultant product was washed with 50 ml of ethanol and dried to give 2.2 g of a bluish green powder. The powder was analyzed by FD-MS to show that it was a phthalocyanine compound (f).

SYNTHESIS EXAMPLE 7

Synthesis of phthalocyanine compound (g)

3.2 Grams of hydroxyaluminum octachloro-tetra[2,2'-bis (trifluoromethyl)propoxy]phthalocyanine and 1.5 g of ferrocenesulfonic acid chloride were added to 150 ml of benzene, then, 0.5 g of pyridine was added, and the mixture was refluxed under heat for 3 hours. The reaction mixture was cooled, and then diluted with 350 ml of benzene, and 300 ml of hexane was dropwise added. The mixture was stirred for 2 hours. A precipitated crystal was recovered by filtration, then washed with benzene/hexane (2/1) mixed solvents and dried to give 2.0 g of a bluish green powder. The powder was analyzed by FD-MS to show that it was a phthalocyanine compound (g).

SYNTHESIS EXAMPLE 8

Synthesis of phthalocyanine compound (h)

3.0 Grams of dihydroxysilicon tetra[2,2'-bis (trimethylfluoromethyl)propoxy]phthalocyanine was dissolved in 100 ml of N-methylpyrrolidone, 2.0 g of 3-(4-diethylaminophenylazo)benzenesulfonic acid was added, and the mixture was stirred under heat at 80° C. for 2 hours. The reaction mixture was poured into 2.0 l of ice water, and a precipitated crystal was recovered by filtration, washed with water and dried to give a dark green powder. The powder was dissolved in 200 ml of chloroform, insolubles were filtered off, and the solvent in the filtrate was distilled off to give 1.6 g of a dark green powder. The powder was analyzed by FD-MS to show that it was a phthalocyanine compound (h).

SYNTHESIS EXAMPLE 9

Synthesis of phthalocyanine compound (i)

3.0 Grams of diphenylphosphinoyloxy-hydroxysilicon tetra(2,5-dimethyl-3-pentyloxy)phthalocyanine was dissolved in 100 ml of sulforan スルホラン, 1.0 g of 3-(2-hydroxynaphthylazo)benzene was added, and the mixture was stirred under heat at 80° C. for 2 hours. The reaction mixture was poured into 2.0 l of ice water, and a precipitated crystal was recovered by filtration, washed with water and dried to give a dark green powder. The powder was dissolved in 200 ml of chloroform, insolubles were filtered off, and the solvent in the filtrate was distilled off to give 1.8 g of a dark green powder. The powder was analyzed by FD-MS to show that it was a phthalocyanine compound (i).

SYNTHESIS EXAMPLE 10

Synthesis of phthalocyanine compound (j)

3.2 Grams of diphenylphosphinoyloxyaluminum octachloro-tetra[2,2'-bis(trifluoromethyl)propoxy]-phthalocyanine was dissolved in 100 ml of N-methylpyrrolidone, 1.5 g of ferrocenesulfonic acid was added, and the mixture was stirred at 25° C. for 2 hours. The reaction mixture was poured into 200 ml of ice water, and the resultant precipitate was recovered by filtration and washed with water to give a green paste. The paste was dissolved in 400 ml of acetone, and insolubles were filtered off. Then, 200 ml of octane was dropwise added to the filtrate, and the mixture was stirred for 3 hours. The resultant precipitate was recovered by filtration, washed with octane and dried to give 0.9 g of a green powder. The powder was analyzed by FD-MS to show that it was a phthalocyanine compound (j). Further, a solution of the powder in ethyl cellosolve was also measured for an electron absorption spectrum to show that the maximum absorption peak shifted about 10 nm in the larger wavelength direction from the maximum absorption peak of the raw material, diphenylphosphinoyloxyaluminum octachloro-tetra[2,2'-bis (trifluoromethyl)propoxy]phthalocyanine. It was therefore found that the reagent, ferrocenesulfonic acid and the central metal, Al, of the phthalocyanine as a raw material had mutual effects on each other by ionic bonding.

SYNTHESIS EXAMPLE 11

Synthesis of phthalocyanine compound (k)

2.8 Grams of hydroxyaluminum tetra(2,2,3,3-tetrafluoropropxy)phthalocyanine was dissolved in 100 ml of N-methylpyrrolidone, 3.0 g of ferrocenesulfonic acid was added, and the mixture was stirred at 80° C. for 2 hours. The reaction mixture was poured into 200 ml of ice water, and the resultant precipitate was recovered by filtration and washed with water to give a green paste. The paste was dissolved in 400 ml of acetone, and insolubles were filtered off. Then, 200 ml of octane was dropwise added, and the mixture was stirred for 3 hours. The resultant precipitate was recovered by filtration, washed with octane and dried to give 1.3 g of a green powder. The powder was analyzed by FD-MS to show that it was a phthalocyanine compound (k).

SYNTHESIS EXAMPLE 12

Synthesis of phthalocyanine compound (1)

3.0 Grams of dihydroxygermanium tetrabromo-tetra-tert-butylphthalocyanine was added to a solution containing 100 ml of xylene and 0.5 g of pyridine, 1.5 g of anthraquinone-β-sulfonic acid chloride was added, and the mixture was refluxed under heat for 3 hours. The reaction mixture was cooled, and then poured into 300 ml of octane, and the resultant precipitate was recovered by filtration and dissolved in 50 ml of acetone. Insolubles were filtered off, and 50 ml of octane was added to form a green precipitate. The precipitate was recovered by filtration, washed with octane and dried to give 0.7 g of a green powder. The powder was analyzed by FD-MS to show that it was a phthalocyanine compound (1).

SYNTHESIS EXAMPLE 13

Synthesis of phthalocyanine compound (m)

3.0 Grams of hdyroxygallium tetra(tert-butyl) phenylthiophthalocyanine and 3.0 g of a nickel complex sulfonic acid compound having a structure of the formula below were 100 ml of N-methylpyrrolidone, and the mixture was stirred under heat at 90° C. for 3hours. The reaction mixture was cooled, and then poured into 200 ml of ethanol, and the resultant precipitate was recovered by filtration, washed with ethanol and dried to give 3.1 g of a green powder. The powder was analyzed by FD-MS to show that it was a phthalocyanine compound (m).

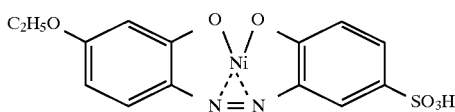

SYNTHESIS EXAMPLE 14

Synthesis of phthalocyanine compound (n)

2.5 Grams of diphenylphosphinoyloxyaluminum tetra (neopentyloxy)phthalocyanine and 1.0 g of butylferrocene-sulfonic acid were added to 50 ml of methyl cellosolve, and the mixture was stirred at 25° C. for 4 hours. Insolubles were filtered off, and then the solvent was distilled off under reduced pressure. The residue was filtered by adding 50 ml of octane, and the product obtained by the filtration was washed with 100 ml of octane and dried to give 2.8 g of a green powder. The powder was analyzed by FD-MS to show that it was a phthalocyanine compound (n).

Example 1 and Comparative Example 1

100 mg of one of the phthalocyanine compounds (a) to (n) or one of comparative phthalocyanine compounds (o) and (p) of the formulae below was added to 3 ml of ethyl cellosolve and dissolved with an ultrasonic cleaner. The solution was subjected to a 0.2μ filter, and the resultant solution was used to form a dyestuff film on a glass substrate which had been heat-treated under reduced pressure, with a spin coater at 1,200 rpm. The formed film was measured for an absorbance (Abs.) at a maximum absorption peak (λmax) with a spectrophotometer, and the measurement value was taken as 100. Then, the glass substrate having the film formed thereon was subjected to a light resistance tester, irradiated at 50,000 lux for 150 hours and then similarly measured for an absorbance at λmax, and the film was evaluated on the basis of a ratio of the measurement value to the initial value 100.

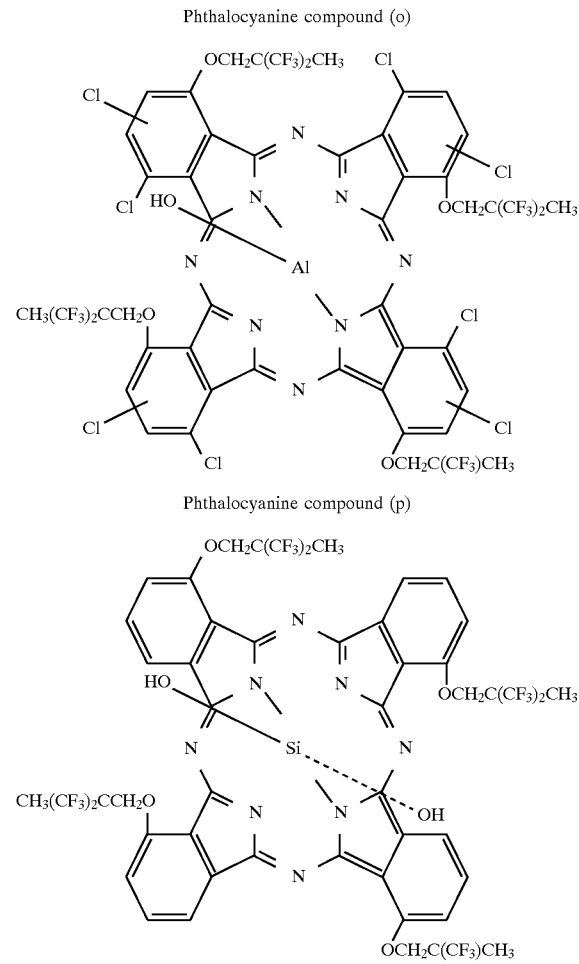

Phthalocyanine compound (o)

Phthalocyanine compound (p)

TABLE 1

| Phthalocyanine compound | Before light resistance test | After light resistance test |
|---|---|---|
| (a) | 100 | 94 |
| (b) | 100 | 91 |
| (c) | 100 | 89 |
| (d) | 100 | 93 |
| (e) | 100 | 95 |
| (f) | 100 | 92 |
| (g) | 100 | 96 |
| (h) | 100 | 92 |
| (i) | 100 | 88 |
| (j) | 100 | 97 |
| (k) | 100 | 90 |
| (l) | 100 | 87 |
| (m) | 100 | 92 |
| (n) | 100 | 95 |
| (o) | 100 | 74 |
| (p) | 100 | 81 |

Table 1 shows that a decrease in the absorbance of the thin films of the phthalocyanine compound of the formula (1) relative to the initial values is very small as compared with a case using the comparative phthalocyanine compounds (o) and (p), and that all the decreases are within 15%. It is therefore seen that the axial substituents of the phthalocyanine compounds (a) to (n) have an effective effect on the improvement of light resistance.

Example 2

A 5 wt % ethyl cellosolve solution of one of the phthalocyanine compounds (a) to (n) was prepared, and a film having a thickness of 500 angstroms was formed therefrom with a spin coater on a polycarbonate substrate which had a guide groove having a depth of 1,600 angstroms, a width of 0.4 μm and a pitch of 1.6 μm and had a thickness of 1.2 mm, an outer diameter of 200 mm and an inner diameter of 30 mm. Then, as a reflection film, a film having a thickness of 800 angstrom was formed from gold on the above dyestuff film by sputtering. Further, a protective film was formed thereon from a UV curable film, to obtain a CD-R disk. An EFM signal was recorded in this medium with a semiconductor laser at a linear velocity of 1.2 mm/sec. Recorded signal characteristics were evaluated according to Orange Book.

Then, the above optical disk was subjected to a light resistance tester at 50,000 lux for 100 hours, and then taken out. Recording was carried out, and recorded signal characteristics were evaluated, in the same manner as above. Table 2 shows the results.

The evaluated recorded signal characteristics were an optimum recording power (PO, the optimum recording power), a maximum value of reflection of pit arrays (Rtop, Refraction top), a ratio of occurrence of errors in pit arrays (BLER, Block Error Rate) and a distance between a maximum value and a minimum value of reflectance in the longest pit array (LLT modulation factor, IIT modulation).

Table 2 shows that the optical recording media (CD-R) using the phthalocyanine compounds (a) to (n) has stable recording characteristics such as excellent recording sensitivity, small error rates and high modulation degrees, and that, particularly, since there is no large difference in recording characteristics between the media not tested on the light resistance and the tested media, the media can fully comply with fast-access storage and has high reliability.

TABLE 2

| Phthalocyanine compound | | PO mw | Rtop % | BLER Max/ 10 sec | IIT modulation degree |
|---|---|---|---|---|---|
| (a) | Initial | 6.4 | 72 | 5> | 54 |
| (a) | Alrt* | | 68 | 12 | 51 |
| (b) | Initial | 5.8 | 68 | 5> | 62 |
| (b) | Alrt* | | 64 | 14 | 58 |
| (c) | Initial | 5.5 | 67 | 5> | 65 |
| (c) | Alrt* | | 66 | 10 | 61 |
| (d) | Initial | 5.3 | 66 | 5> | 53 |
| (d) | Alrt* | | 62 | 21 | 50 |
| (e) | Initial | 5.6 | 69 | 5> | 62 |
| (e) | Alrt* | | 69 | 5> | 59 |
| (f) | Initial | 6.0 | 72 | 5> | 64 |
| (f) | Alrt* | | 72 | 5> | 63 |
| (g) | Initial | 5.5 | 70 | 5> | 65 |
| (g) | Alrt* | | 70 | 5> | 63 |
| (h) | Initial | 6.4 | 63 | 5> | 54 |
| (h) | Alrt* | | 58 | 17 | 50 |
| (i) | Initial | 6.8 | 61 | 5> | 62 |
| (i) | Alrt* | | 57 | 14 | 58 |
| (j) | Initial | 5.5 | 65 | 5> | 60 |
| (j) | Alrt* | | 63 | 8 | 60 |
| (k) | Initial | 5.3 | 56 | 5> | 53 |
| (k) | Alrt* | | 55 | 18 | 50 |
| (l) | Initial | 5.6 | 54 | 5> | 57 |
| (l) | Alrt* | | 51 | 26 | 55 |
| (m) | Initial | 5.1 | 49 | 5> | 72 |
| (m) | Alrt* | | 49 | 28 | 68 |
| (n) | Initial | 5.5 | 69 | 5> | 65 |
| (n) | Alrt* | | 67 | 5> | 62 |

Alrt* = After light resistance test

Example 3 and Comparative Example 2

A solution of 150 mg of the phthalocyanine compound (j) in 3 ml of ethyl cellosolve was prepared, and a film having a thickness of 800 angstroms was formed therefrom with a spin coater on a polycarbonate substrate which had a guide groove having a depth of 1,800 angstroms, a width of 0.4 μm and a pitch of 1.6 μm and had a thickness of 1.2 mm, an outer diameter of 200 mm and an inner diameter of 30 mm. Then, as a reflection film, a film having a thickness of 800 angstrom was formed from gold on the dyestuff film by sputtering. Further, a protective film was formed thereon from a UV curable film, to obtain a CD-R disk. An EFM signal was recorded in this medium with a semiconductor laser at a linear velocity of 1.2 mm/sec. Recorded signal characteristics were evaluated according to Orange Book.

Then, the above optical disk was subjected to a light resistance tester at 50,000 lux for 100 hours, and then taken out. Recording was carried out, and recorded signal characteristics were evaluated, in the same manner as above. Table 3 shows the results.

For comparision, a 5% solution of a phthalocyanine compound (q) of the formula below was used to form a CD-R disk in the same manner as above. And, recording characteristics were evaluated, and light resistance test were carried out, in the same manner as above. Table 3 shows the results.

Phthalocyanine compound (Q)

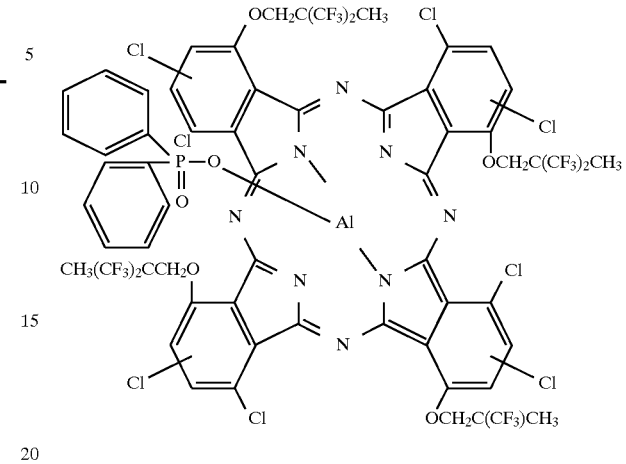

TABLE 3

| Example | Composition | | PO mW | Rtop % | BLER Max/10 sec | ITT modulation |
|---|---|---|---|---|---|---|
| Example 3 | (j) | Initial | 5.6 | 69 | 5> | 65 |
| | | Alrt* | | 68 | 5> | 64 |
| Comparative Example 2 | (q) | Initial | 6.0 | 70 | 5> | 62 |
| | | Alrt* | | 60 | 210 | 55 |

Alrt* = After light resistance test

Table 3 shows the following. As compared with the phthalocyanine compound (q), the phthalocyanine compound (j) shows improvements in recording characteristics such as modulation degree and error rate, and in particular, the phthalocyanine compound (j) shows almost no difference between the medium not tested on the light resistance test and the tested medium. In contrast, after the light resistance test, the phthalocyanine compound (q) shows a decreased Rtop, a decreased modulation degree and an increased error rate. That is, it is seen that the phthalocyanine compound (j) shows improvements in recording characteristics over the phthalocyanine compound (q) and improved light resistance due to the effect of the particular axial substituent having a sulfonic acid group.

Industrial Utility

By allowing a recording layer to contain the phthalocyanine compound having a particular axial substituent having a sulfonic acid group, there is provided an optical recording medium having recording sesitivity and recording characteristics which can fully comply with fast-access storage and having excellent light resistance.

We claim:

1. An optical recording material which is a phthalocyanine compound of the following formula (1), the formula (1),

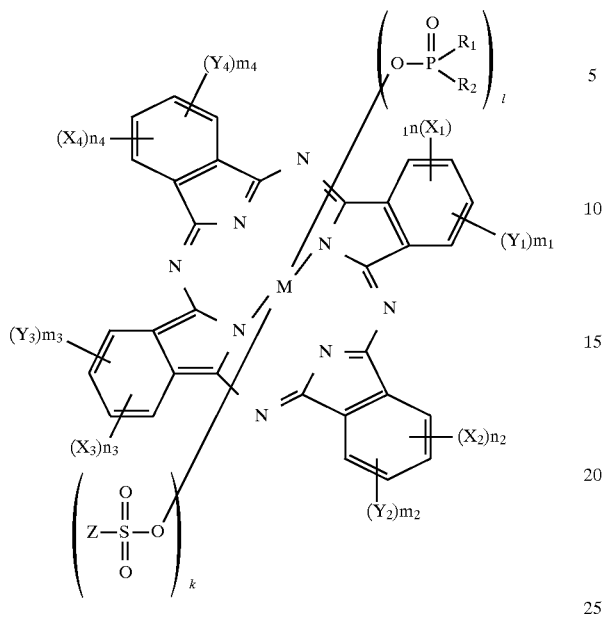

wherein each of $X_1$ to $X_4$ is independently a hydrogen atom, an alkyl group, a substituted alkyl group, an aryl group, a substituted aryl group, an alicyclic residue, a substituted alicyclic residue, an aralkyl group, a substituted aralkyl group, a heterocyclic ring, a substituted heterocyclic ring, an alkoxy group, a substituted alkoxy group, an aryloxy group, a substituted aryloxy group, an alkylthio group or a substituted arylthio group, each of Y1 to $Y_4$ is independently a hydrogen atom, a halogen atom, a nitro group, a phthalimidemethyl group, a substituted phthalimidemethyl group, a sulfoneamide group or a substituted sulfoneamide group, each of $R_1$ and $R_2$ is independently a hydrogen atom, a halogen atom, a hydroxyl group, an alkyl group, a substituted alkyl group, an aryl group, a substituted aryl group, an aralkyl group, a substituted aralkyl group, an alkoxy group, a substituted alkoxy group, an aryloxy group, a substituted aryloxy group, an alkylthio group, a substituted alkylthio group, an arylthio group, a substituted arylthio group, an alkylamino group, a substituted alkylamino group, a dialkylamino group, a substituted dialkylamino group, an arylamino group, a substituted arylamino group, a diarylamino group or a substituted diarylamino group, M is Al, Ga, In, Si, Ge or Sn, Z is an azo compound, an anthraquinone compound or a metal complex compound of one of the following formulae (2) to (6), $n_1$ to $n_4$ are the numbers of substituents $X_1$ to $X_4$, each of them being independently an integer of 1 to 4, $m_1$ to $m_4$ are the numbers of substituents $Y_1$ to $Y_4$, each of them being independently an integer of 0 to 4, k is the number of an axial substituent, $-OSO_2-Z$, and is 1 or 2, and l is the number of an axial substituent, $-OP(=O)R_1R_2$, and is 0 or 1, provided that k+l is 1 or 2, the formula (2),

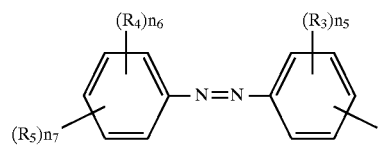

wherein each of $R_3$, $R_4$ and $R_5$ is independently a hydrogen atom, a halogen atom, a hydroxyl group, a nitro group, a cyano group, a carboxylic acid group, a carboxylic acid ester group, a sulfonic acid group, a sulfonic acid ester group, an alkyl group, a substituted alkyl group, an aryl group, a substituted aryl group, a cycloalkyl group, a substituted cycloalkyl group, an aralkyl group, a substituted aralkyl group, a heterocyclic ring, a substituted heterocyclic ring, an alkoxy group, a substituted alkoxy group, an aryloxy group, a substituted aryloxy group, an alkylthio group, a substituted alkylthio group, an arylthio group, a substituted arylthio group, an amino group, an alkylamino group, a substituted alkyl amino group, a dialkylamino group, a substituted dialkylamino group, an arylamino group or a substituted arylamino group, $n_5$ is the number of the substituent $R_3$ and is an integer of 0 to 4, and $n_6$ and $n_7$ are the numbers of the substituents $R_4$ and $R_5$, each of them being an integer of 0 to 5, the formula (3),

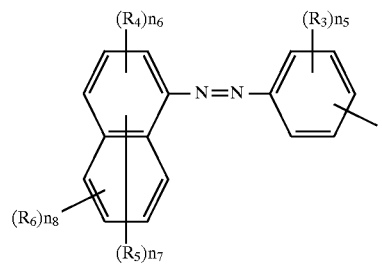

wherein $R_3$ to $R_6$ have the same meanings as those of $R_3$ to $R_5$ in the formula (2), $n_5$ is the number of the substituent $R_3$ and is an integer of 0 to 4, and $n_6$ to $n_8$ are the numbers of the substituents $R_4$ to $R_6$, each of them being an integer of 0 to 3, the formula (4),

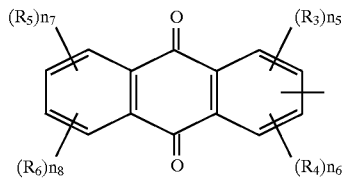

wherein $R_3$ to $R_6$ have the same meanings as those of $R_3$ to $R_5$ in the formula (2), and $n_5$ to $n_8$ are the numbers of the substituents $R_3$ to $R_6$, each of them being an integer of 0 to 3, the formula (5)

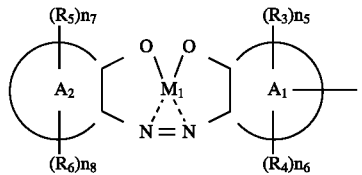

wherein $A_1$ and $A_2$ are benzene rings or naphthalene rings, $R_3$ to $R_6$ have the same meanings as those of $R_3$ to $R_5$ in the formula (2), $n_5$ to $n_8$ are the numbers of the substituents $R_3$ to $R_6$, each of them being an integer of 0 to 3, and $M_1$ is a transition metal atom, and the formula (6)

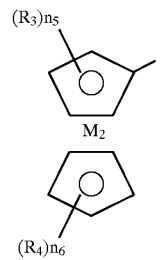

wherein $R_3$ and $R_4$ have the same meanings as those of $R_3$ to $R_5$ in the formula (2), $n_5$ is the number of the substituent $R_3$ and is an integer of 0 to 4, $n_6$ is the number of the substituent $R_4$ and is an integer of 0 to 5, and $M_2$ is a transition metal.

2. An optical recording material according to claim 1, wherein each of k and l in the formula (1) is 1.

3. An optical recording material according to claim 1, wherein l in the formula (1) is 0.

4. An optical recording medium comprising four layers of a transparent substrate, a recording layer, an reflection layer and a protective layer, the recording layer containing the optical recording material recited in claim 1.

* * * * *